United States Patent
Xu

(10) Patent No.: US 7,426,180 B2
(45) Date of Patent: Sep. 16, 2008

(54) RAPID BUILD TRANSMISSION-LIMIT METHOD AND STRUCTURE FOR BSS STATIONS IN WIRELESS COMMUNICATION NETWORK

(75) Inventor: Shugong Xu, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1125 days.

(21) Appl. No.: 10/375,325

(22) Filed: Feb. 27, 2003

(65) Prior Publication Data

US 2004/0090982 A1    May 13, 2004

Related U.S. Application Data

(60) Provisional application No. 60/424,926, filed on Nov. 8, 2002.

(51) Int. Cl.
*H04J 1/16* (2006.01)
*H04L 12/413* (2006.01)

(52) U.S. Cl. .................... 370/229; 370/447
(58) Field of Classification Search ............ None
See application file for complete search history.

(56) References Cited

U.S. PATENT DOCUMENTS

2002/0075869 A1    6/2002   Us
2003/0048805 A1*   3/2003   Yoshihara et al. ......... 370/468
2003/0081547 A1*   5/2003   Ho ............................. 370/229

FOREIGN PATENT DOCUMENTS

| EP | 1189388 | 3/2002 |
|---|---|---|
| WO | WO0171981 | 9/2001 |
| WO | WO0237754 | 5/2002 |

* cited by examiner

*Primary Examiner*—Firmin Backer
*Assistant Examiner*—Clemence Han
(74) *Attorney, Agent, or Firm*—David C. Ripma; Jon M. Dickinson; Robert D. Varitz

(57) ABSTRACT

A method and apparatus employable in a wireless, packet-based network communication system for managing transmission-limit build-up performed by participating network BSS stations, whereby, when singular ones (one only) of these stations, during a given transmission budget beacon interval, are attempting to gain access to network transmission bandwidth, they are permitted to invoke an algorithm for rapid transmission-limit build-up. Such rapid build-up is based upon allowing such a station to begin its accessing process with an elevated, initial transmission limit which is created as a relatively high percentage (preferably about 80-percent) of the last prior beacon-announced network transmission budget. If more than one such currently non-transmitting stations are simultaneously attempting anew to gain network bandwidth access, rapid build-up is not permitted, thus to minimize an otherwise possible network communication traffic jam.

1 Claim, 7 Drawing Sheets

PRIOR ART

| BEACON | TxBUDGET | STATION 1 | | | STATION 2 | | | STATION 3 | | |
|---|---|---|---|---|---|---|---|---|---|---|
| | | TxCOUNTER: | TxMEMORY: | TxLIMIT1 | TxCOUNTER: | TxMEMORY: | TxLIMIT1 | TxCOUNTER: | TxMEMORY: | TxLIMIT1 |
| 0 | 100 | 0 | 10 | 10 | 0 | | | 0 | | |
| 1 | 88 | 10 | 19 | 19 | 0 | | | 0 | | |
| 2 | 77.2 | 19 | 27.1 | 27.1 | 0 | | | 0 | | |
| 3 | 67.48 | 27.1 | 34.39 | 34.39 | 0 | | | 0 | | |
| 4 | 58.732 | 34.39 | 40.951 | 40.951 | 0 | | | 0 | | |
| 5 | 52 | 40 | 46.8559 | 45.8559 | 0 | | | 0 | | |
| 6 | 52 | 40 | 52.17031 | 52.17031 | 0 | | | 0 | | |
| 7 | 52 | 40 | 56.95328 | 56.95328 | 0 | | | 0 | | |
| 8 | 52 | 40 | 61.25795 | 61.25795 | 0 | | | 0 | | |
| 999 | 52 | 40 | 65.13216 | <>100 | 0 | | | 0 | | |
| 1000 | 52 | 40 | 68.61894 | 68.61894 | 0 | 5.2 | 5.2 | 0 | | |
| 1001 | 45.76 | 40 | 71.13305 | 71.13305 | 5.2 | 9.88 | 9.88 | 0 | | |
| 1002 | 40.144 | 40 | 72.83414 | 72.83414 | 9.88 | 14.092 | 14.092 | 0 | | |
| 1003 | 35.0896 | 40 | 73.85969 | 73.85969 | 14.092 | 17.8828 | 17.8828 | 0 | | |
| 1004 | 30.54064 | 40 | 74.32778 | 74.32778 | 17.8828 | 21.29452 | 21.29452 | 0 | | |
| 1005 | 26.44858 | 40 | 74.33966 | 74.33966 | 21.29452 | 24.36507 | 24.36507 | 0 | | |
| 1006 | 22.76192 | 40 | 73.98189 | 73.98189 | 24.36507 | 27.12856 | 27.12856 | 0 | | |
| 1007 | 19.44573 | 40 | 73.32827 | 73.32827 | 27.12856 | 29.61571 | 29.61571 | 0 | | |
| 1008 | 16.46115 | 40 | 72.44156 | 72.44156 | 29.61571 | 31.85413 | 31.85413 | 0 | | |
| 1009 | 16 | 40 | 71.5974 | 71.5974 | 30 | 33.86872 | 33.86872 | 0 | | |
| 1010 | 16 | 40 | 70.83766 | 70.83766 | 30 | 35.68185 | 35.68185 | 0 | | |
| 1011 | 16 | 40 | 70.1539 | 70.1539 | 30 | 37.31366 | 37.31366 | 0 | | |
| 1012 | 16 | 40 | 68.53851 | 68.53851 | 30 | 38.7823 | 38.7823 | 0 | | |
| 1013 | 16 | 40 | 68.98466 | 68.98466 | 30 | 40.10407 | 40.10407 | 0 | | |
| 1014 | 16 | 40 | 68.48619 | 68.48619 | 30 | 41.29366 | 41.29366 | 0 | | |
| 1015 | 16 | 40 | 68.03757 | 68.03757 | 30 | 42.3643 | 42.3643 | 0 | | |
| 1016 | 16 | 40 | | 67.63381 | 30 | 43.32787 | 43.32787 | 0 | | |
| 1017 | 16 | 40 | 67.27043 | 67.27043 | 30 | 44.19508 | 44.19508 | 0 | | |
| 1018 | 16 | 40 | 66.94339 | 66.94339 | 30 | 44.97557 | 44.97557 | 0 | | |
| 1019 | 16 | 40 | 66.64905 | 66.64905 | 30 | 45.67801 | 45.67801 | 0 | | |
| 1020 | 16 | 40 | 66.38415 | 66.38415 | 30 | 46.31021 | 46.31021 | 0 | | |
| 1021 | 16 | 40 | 66.14573 | 66.14573 | 30 | 46.87919 | 46.87919 | 0 | | |
| | 0 | 40 | 66.14573 | | 30 | 46.87919 | | | | |
| 1999 | 16 | 40 | 65.93116 | 52 | 30 | 47.39127 | 47.39127 | 0 | 0.4 | 0.4 |
| 2000 | 15.52 | 40 | 65.69004 | 65.69004 | 30 | 47.80414 | 47.80414 | 0.4 | 1.96 | 1.96 |

FIG.4

PRIOR ART

| | | | STATION 1 | | | STATION 2 | | | STATION 3 | |
|---|---|---|---|---|---|---|---|---|---|---|
| 2001 | 13.646 | 40 | 65.28584 | 65.28584 | 30 | 47.98853 | 47.98853 | 1.96 | 3.364 | 3.364 |
| 2002 | 11.9632 | 40 | 64.75357 | 64.75357 | 30 | 47.986 | 47.986 | 3.364 | 4.6276 | 4.6276 |
| 2003 | 10.44688 | 40 | 64.1229 | 64.1229 | 30 | 47.83209 | 47.83209 | 4.6276 | 5.76484 | 5.76484 |
| 2004 | 9.082192 | 40 | 63.41883 | 63.41883 | 30 | 47.5571 | 47.5571 | 5.76484 | 6.788356 | 6.788356 |
| 2005 | 7.853973 | 40 | 62.66235 | 62.66235 | 30 | 47.18678 | 47.18678 | 6.788356 | 7.70952 | 7.70952 |
| 2006 | 6.748576 | 40 | 61.87097 | 61.87097 | 30 | 46.74296 | 46.74296 | 7.70952 | 8.538568 | 8.538568 |
| 2007 | 5.753718 | 40 | 61.05925 | 61.05925 | 30 | 46.24404 | 46.24404 | 8.538568 | 9.284712 | 9.284712 |
| 2008 | 4.858346 | 40 | 60.23916 | 60.23916 | 30 | 45.70547 | 45.70547 | 9.284712 | 9.95624 | 9.95624 |
| 2009 | 4.052512 | 40 | 59.42049 | 59.42049 | 30 | 45.14017 | 45.14017 | 9.95624 | 10.56062 | 10.56062 |
| 2010 | 3.32726 | 40 | 58.61117 | 58.61117 | 30 | 44.55888 | 44.55888 | 10.56062 | 11.10455 | 11.10455 |
| 2011 | 2.674534 | 40 | 57.8175 | 57.8175 | 30 | 43.97045 | 43.97045 | 11.10455 | 11.5941 | 11.5941 |
| 2012 | 2.087081 | 40 | 57.04446 | 57.04446 | 30 | 43.38211 | 43.38211 | 11.5941 | 12.03469 | 12.03469 |
| 2013 | 1.558373 | 40 | 56.29585 | 56.29585 | 30 | 42.79974 | 42.79974 | 12.03469 | 12.43122 | 12.43122 |
| 2014 | 1.082536 | 40 | 55.57452 | 55.57452 | 30 | 42.22802 | 42.22802 | 12.43122 | 12.7881 | 12.7881 |
| 2015 | 0.654262 | 40 | 54.8825 | 54.8825 | 30 | 41.67064 | 41.67064 | 12.7881 | 13.10929 | 13.10929 |
| 2016 | 0.4 | 40 | 54.23425 | 54.23425 | 30 | 41.14358 | 41.14358 | 13 | 13.39836 | 13.39836 |
| 2017 | 0.4 | 40 | 53.65082 | 53.65082 | 30 | 40.66922 | 40.66922 | 13 | 13.65852 | 13.65852 |
| 2018 | 0.4 | 40 | 53.12574 | 53.12574 | 30 | 40.2423 | 40.2423 | 13 | 13.89267 | 13.89267 |
| 2019 | 0.4 | 40 | 52.65317 | 52.65317 | 30 | 39.85807 | 39.85807 | 13 | 14.1034 | 14.1034 |
| 2020 | 0.4 | 40 | 52.22785 | 52.22785 | 30 | 39.51226 | 39.51226 | 13 | 14.29306 | 14.29306 |
| 2021 | 0.4 | 40 | 51.84506 | 51.84506 | 30 | 39.20104 | 39.20104 | 13 | 14.46376 | 14.46376 |
| 2022 | 0.4 | 40 | 51.50056 | 51.50056 | 30 | 38.92093 | 38.92093 | 13 | 14.61738 | 14.61738 |
| 2023 | 0.4 | 40 | 51.1905 | 51.1905 | 30 | 38.66884 | 38.66884 | 13 | 14.75564 | 14.75564 |
| 2024 | 0.4 | 40 | 50.91145 | 50.91145 | 30 | 38.44196 | 38.44196 | 13 | 14.88008 | 14.88008 |
| 2025 | 0.4 | 40 | 50.66031 | 50.66031 | 30 | 38.23776 | 38.23776 | 13 | 14.99207 | 14.99207 |
| 2026 | 0.4 | 40 | 50.43428 | 50.43428 | 30 | 38.05398 | 38.05398 | 13 | 15.09286 | 15.09286 |
| 2027 | 0.4 | 40 | 50.23085 | 50.23085 | 30 | 37.88859 | 37.88859 | 13 | 15.18358 | 15.18358 |
| 2028 | 0.4 | 40 | 50.04776 | 50.04776 | 30 | 37.73973 | 37.73973 | 13 | 15.26522 | 15.26522 |
| 2029 | 0.4 | 40 | 49.88299 | 49.88299 | 30 | 37.60575 | 37.60575 | 13 | 15.3387 | 15.3387 |
| 2030 | 0.4 | 40 | 49.73469 | 49.73469 | 30 | 37.48518 | 37.48518 | 13 | 15.40483 | 15.40483 |
| 2031 | 0.4 | 40 | 49.60122 | 49.60122 | 30 | 37.37666 | 37.37666 | 13 | 15.46435 | 15.46435 |
| 2032 | 0.4 | 40 | 49.4811 | 49.4811 | 30 | 37.27899 | 37.27899 | 13 | 15.51791 | 15.51791 |
| 2033 | 0.4 | 40 | 49.37299 | 49.37299 | 30 | 37.1911 | 37.1911 | 13 | 15.56612 | 15.56612 |
| 2034 | 0.4 | 40 | 49.27569 | 49.27569 | 30 | 37.11199 | 37.11199 | 13 | 15.60951 | 15.60951 |
| 2035 | 0.4 | 40 | 49.18812 | 49.18812 | 30 | 37.04079 | 37.04079 | 13 | 15.64856 | 15.64856 |
| 2036 | 0.4 | 40 | 49.10931 | 49.10931 | 30 | 36.97671 | 36.97671 | 13 | 15.6837 | 15.6837 |

FIG.5

PRIOR ART

|      |     | STATION 1 |          |          | STATION 2 |          |          | STATION 3 |          |          |
|------|-----|-----------|----------|----------|-----------|----------|----------|-----------|----------|----------|
| 2037 | 0.4 | 40        | 49.03838 | 49.03838 | 30        | 39.91904 | 39.91904 | 13        | 15.71533 | 15.71533 |
| 2038 | 0.4 | 40        | 48.97454 | 48.97454 | 30        | 36.86713 | 36.86713 | 13        | 15.7438  | 15.7438  |
| 2039 | 0.4 | 40        | 48.91709 | 48.91709 | 30        | 36.82042 | 36.82042 | 13        | 15.76942 | 15.76942 |

FIG.6

| BEACON | TxBUDGET | STATION 1 | | | STATION 2 | | | STATION 3 | | |
|---|---|---|---|---|---|---|---|---|---|---|
| | | TxCOUNTER: | TxMEMORY: | TxLIMIT1 | TxCOUNTER: | TxMEMORY: | TxLIMIT1 | TxCOUNTER: | TxMEMORY: | TxLIMIT1 |
| 0 | 100 | 0 | 80 | 80 | 0 | | | 0 | | |
| 1 | 52 | 40 | 82 | 82 | 0 | | | 0 | | |
| 2 | 52 | 40 | 83.8 | 83.8 | 0 | | | 0 | | |
| 3 | 52 | A 40 | 85.42 | 85.42 | 0 | | | 0 | | |
| 4 | 52 | 40 | 86.878 | 86.878 | 0 | | | 0 | | |
| 5 | 52 | 40 | 88.1902 | 88.1902 | 0 | | | 0 | | |
| 6 | 52 | 40 | 89.37118 | 89.37118 | 0 | | | 0 | | |
| 7 | 52 | 40 | 90.43406 | 90.43406 | 0 | | | 0 | | |
| 8 | 52 | 40 | 91.39066 | 91.39066 | 0 | | B | 0 | | |
| 999 | 52 | 40 | 92.25159 | <> 100 | 0 | | | 0 | | |
| 1000 | 52 | 40 | 93.02643 | 93.02643 | 0 | 41.6 | 41.6 | 0 | | |
| 1001 | 16 | 40 | 90.12379 | 90.12379 | 30 | 42.64 | 42.64 | 0 | | |
| 1002 | 16 | 40 | 87.51141 | 87.51141 | 30 | 43.576 | 43.576 | 0 | | |
| 1003 | 16 | 40 | 85.16027 | 85.16027 | 30 | 44.4184 | 44.4184 | 0 | | |
| 1004 | 16 | 40 | 83.04424 | 83.04424 | 30 | 45.17656 | 45.17656 | 0 | | |
| 1005 | 16 | 40 | 81.13982 | 81.13982 | 30 | 45.8589 | 45.8589 | 0 | | |
| 1006 | 16 | 40 | 79.42584 | 79.42584 | 30 | 45.47301 | 45.47301 | 0 | | |
| 1007 | 16 | 40 | 77.88325 | 77.88325 | 30 | 47.02571 | 47.02571 | 0 | | |
| 1008 | 16 | 40 | 76.49493 | 76.49493 | 30 | 47.52314 | 47.52314 | 0 | | |
| 1009 | 16 | 40 | 75.24543 | 75.24543 | 30 | 47.97083 | 47.97083 | 0 | | |
| 1010 | 16 | 40 | 74.12089 | 74.12089 | 30 | 48.37374 | 48.37374 | 0 | | |
| 1011 | 16 | 40 | 73.1088 | 73.1088 | 30 | 48.73637 | 48.73637 | 0 | | |
| 1012 | 16 | 40 | 72.19792 | 72.19792 | 30 | 49.06273 | 49.06273 | 0 | | |
| 1013 | 16 | 40 | 71.37813 | 71.37813 | 30 | 49.35646 | 49.35646 | 0 | | |
| 1014 | 16 | 40 | 70.64032 | 70.64032 | 30 | 49.62081 | 49.62081 | 0 | | |
| 1015 | 16 | 40 | 69.97628 | 69.97628 | 30 | 49.85873 | 49.85873 | 0 | | |
| 1016 | 16 | 40 | 69.37866 | 69.37866 | 30 | 50.07286 | 50.07286 | 0 | | |
| 1017 | 16 | 40 | 68.84079 | 68.84079 | 30 | 50.26557 | 50.26557 | 0 | | |
| 1018 | 16 | 40 | 68.35671 | 68.35671 | 30 | 50.43902 | 50.43902 | 0 | | |
| 1019 | 16 | 40 | 67.92104 | 67.92104 | 30 | 50.59511 | 50.59511 | 0 | | |
| 1020 | 16 | 40 | 67.52894 | 67.52894 | 30 | 50.7356 | 50.7356 | 0 | | |
| 1021 | 16 | 40 | 67.17604 | 67.17604 | 30 | 50.86204 | 50.86204 | 0 | C | |
| | 0 | 40 | 67.17604 | | 30 | 50.86204 | | | | |
| 1999 | 16 | 40 | 66.85844 | 52 | 30 | 50.97584 | 50.97584 | 0 | 12.8 | 12.8 |
| 2000 | 0.64 | 40 | 65.03659 | 65.03659 | 30 | 49.54225 | 49.54225 | 12.8 | 13.12 | 13.12 |

FIG.7

|  |  | STATION 1 |  |  | STATION 2 |  |  | STATION 3 |  |
|---|---|---|---|---|---|---|---|---|---|
| 2001 | 0.4 | 40 | 63.37294 | 63.37294 | 30 | 48.22803 | 48.22803 | 13 | 13.408 | 13.408 |
| 2002 | 0.4 | 40 | 61.87564 | 61.87564 | 30 | 47.04523 | 47.04523 | 13 | 13.6672 | 13.6672 |
| 2003 | 0.4 | 40 | 60.52808 | 60.52808 | 30 | 45.9807 | 45.9807 | 13 | 13.90048 | 13.90048 |
| 2004 | 0.4 | 40 | 59.31527 | 59.31527 | 30 | 45.02263 | 45.02263 | 13 | 14.11043 | 14.11043 |
| 2005 | 0.4 | 40 | 58.22374 | 58.22374 | 30 | 44.16037 | 44.16037 | 13 | 14.29939 | 14.29939 |
| 2006 | 0.4 | 40 | 57.24137 | 57.24137 | 30 | 43.38433 | 43.38433 | 13 | 14.46945 | 14.46945 |
| 2007 | 0.4 | 40 | 56.35723 | 56.35723 | 30 | 42.6859 | 42.6859 | 13 | 14.6225 | 14.6225 |
| 2008 | 0.4 | 40 | 55.56151 | 55.56151 | 30 | 42.05731 | 42.05731 | 13 | 14.76025 | 14.76025 |
| 2009 | 0.4 | 40 | 54.84536 | 54.84536 | 30 | 41.49158 | 41.49158 | 13 | 14.88423 | 14.88423 |
| 2010 | 0.4 | 40 | 54.20082 | 54.20082 | 30 | 40.98242 | 40.98242 | 13 | 14.99581 | 14.99581 |
| 2011 | 0.4 | 40 | 53.62074 | 53.62074 | 30 | 40.52418 | 40.52418 | 13 | 15.09623 | 15.09623 |
| 2012 | 0.4 | 40 | 53.09867 | 53.09867 | 30 | 40.11176 | 40.11176 | 13 | 15.1866 | 15.1866 |
| 2013 | 0.4 | 40 | 52.6288 | 52.6288 | 30 | 39.74058 | 39.74058 | 13 | 15.26794 | 15.26794 |
| 2014 | 0.4 | 40 | 52.20592 | 52.20592 | 30 | 39.40653 | 39.40653 | 13 | 15.34115 | 15.34115 |
| 2015 | 0.4 | 40 | 51.82533 | 51.82533 | 30 | 39.10587 | 39.10587 | 13 | 15.40703 | 15.40703 |
| 2016 | 0.4 | 40 | 51.48279 | 51.48279 | 30 | 38.83529 | 38.83529 | 13 | 15.46633 | 15.46633 |
| 2017 | 0.4 | 40 | 51.17452 | 51.17452 | 30 | 38.59176 | 38.59176 | 13 | 15.5197 | 15.5197 |
| 2018 | 0.4 | 40 | 50.89706 | 50.89706 | 30 | 38.37258 | 38.37258 | 13 | 15.56773 | 15.56773 |
| 2019 | 0.4 | 40 | 50.64736 | 50.64736 | 30 | 38.17532 | 38.17532 | 13 | 15.61095 | 15.61095 |
| 2020 | 0.4 | 40 | 50.42262 | 50.42262 | 30 | 37.99779 | 37.99779 | 13 | 15.64986 | 15.64986 |
| 2021 | 0.4 | 40 | 50.22036 | 50.22036 | 30 | 37.83801 | 37.83801 | 13 | 15.68487 | 15.68487 |
| 2022 | 0.4 | 40 | 50.03832 | 50.03832 | 30 | 37.69421 | 37.69421 | 13 | 15.71639 | 15.71639 |
| 2023 | 0.4 | 40 | 49.87449 | 49.87449 | 30 | 37.56479 | 37.56479 | 13 | 15.74475 | 15.74475 |
| 2024 | 0.4 | 40 | 49.72704 | 49.72704 | 30 | 37.44831 | 37.44831 | 13 | 15.77027 | 15.77027 |
| 2025 | 0.4 | 40 | 49.59434 | 49.59434 | 30 | 37.34348 | 37.34348 | 13 | 15.79325 | 15.79325 |
| 2026 | 0.4 | 40 | 49.4749 | 49.4749 | 30 | 37.24913 | 37.24913 | 13 | 15.81392 | 15.81392 |
| 2027 | 0.4 | 40 | 49.36741 | 49.36741 | 30 | 37.16422 | 37.16422 | 13 | 15.83253 | 15.83253 |
| 2028 | 0.4 | 40 | 49.27067 | 49.27067 | 30 | 37.0878 | 37.0878 | 13 | 15.84928 | 15.84928 |
| 2029 | 0.4 | 40 | 49.18361 | 49.18361 | 30 | 37.01902 | 37.01902 | 13 | 15.86435 | 15.86435 |
| 2030 | 0.4 | 40 | 49.10524 | 49.10524 | 30 | 36.95712 | 36.95712 | 13 | 15.87791 | 15.87791 |
| 2031 | 0.4 | 40 | 49.03472 | 49.03472 | 30 | 36.9014 | 36.9014 | 13 | 15.89012 | 15.89012 |
| 2032 | 0.4 | 40 | 48.97125 | 48.97125 | 30 | 36.85126 | 36.85126 | 13 | 15.90111 | 15.90111 |
| 2033 | 0.4 | 40 | 48.91412 | 48.91412 | 30 | 36.80614 | 36.80614 | 13 | 15.911 | 15.911 |
| 2034 | 0.4 | 40 | 48.86271 | 48.86271 | 30 | 36.76552 | 36.76552 | 13 | 15.9199 | 15.9199 |
| 2035 | 0.4 | 40 | 48.81644 | 48.81644 | 30 | 36.72897 | 36.72897 | 13 | 15.92791 | 15.92791 |
| 2036 | 0.4 | 40 | 48.7748 | 48.7748 | 30 | 36.69607 | 36.69607 | 13 | 15.93512 | 15.93512 |

|  |  | STATION 1 | | | STATION 2 | | | STATION 3 | |
|---|---|---|---|---|---|---|---|---|---|
| 2037 | 0.4 | 40 | 48.73732 | 48.73732 | 30 | 36.66647 | 36.66647 | 13 | 15.94161 | 15.94161 |
| 2038 | 0.4 | 40 | 48.70358 | 48.70358 | 30 | 36.63982 | 36.63982 | 13 | 15.94745 | 15.94745 |
| 2039 | 0.4 | 40 | 48.67323 | 48.67323 | 30 | 36.81584 | 36.81584 | 13 | 15.9527 | 15.9527 |

FIG.9

RAPID BUILD TRANSMISSION-LIMIT METHOD AND STRUCTURE FOR BSS STATIONS IN WIRELESS COMMUNICATION NETWORK

CROSS REFERENCE TO RELATED APPLICATION

This application claims the benefit of the filing date of previously-filed, currently pending, U.S. Provisional Patent Application Ser. No. 60/424,926, filed Nov. 8, 2002, for "Rapid-Build Transmission-Limit Method and Structure for BSS Stations in Wireless Communication Network". All of the contents of this prior-filed provisional application are fully incorporated herein by reference.

BACKGROUND AND SUMMARY OF THE INVENTION

This invention pertains to a plural-priority-categorized, wireless network communication, and in particular to structure and methodology which promote a rapid build-up of transmission-limit settings in participating basic service set (BSS) stations operating in such a network. As will be explained, it is these transmission-limit settings which play important roles in the speeds with which currently non-transmitting stations that are seeking new access to available network bandwidth can achieve practical, respective, maximum bandwidth utilizations for their transmission.

Generally describing this transmission-limit role, when a station that forms part of a BSS group in a transmission network gains bandwidth access for communication in any one of several possible categories of priority, following the receipt of a transmission budget from an access point (AP) computer that is also part of the same BSS group, it is typical that it takes an appreciable number of successive inter-beacon broadcast intervals for that station to build-up its own, respective transmission limit. During the time that such a build-up is occurring, the particular station involved is not maximally utilizing its capability for communication transmissions over the network. Over time, and where a very large number, for example, of stations are involved, this build-up process can be seen to be a relatively slow process which results in a certain amount of communication inefficiency in the system.

The present invention addresses this issue by providing a special algorithm for use within each station in a BSS group, and within each transmission priority category, which algorithm creates an opportunity for, and promotes as appropriate, very rapid build-up of transmission limits so that the communicating efficiency of a station, once it has gained communication access to the network, is greatly improved, and bandwidth utilization by that station is significantly enhanced.

Fundamentally, the present invention accomplishes the objective of rapid build-up in a station's transmission limit by allowing that station, essentially at the point in time where it gains communication access to the network, to start with a transmission memory, and thus a transmission limit, of a defined, pre-selected percentage (above- 0 percent) of the most recently announced transmission budget. While a different percentage value within a range (described below herein) may be chosen to suit different applications, the percentage value of about 80-percent has been found to be very satisfactory in most applications. Accordingly, the present invention is described and illustrated herein in a setting where that 80-percent value is employed.

Additionally, and while the transmission-limit setting features of the invention may be employed readily in different specific network arrangements, these features are particularly described herein in a form of wireless, packet-based network communication environment which includes a special system for the overall management of BSS station prioritized access to available, unused bandwidth—an environment wherein implementation and practice of the present invention have been found to offer particular utility.

In such a managed-access environment, bandwidth-access flows from the periodic delivering of reports, called "beacons", to all of the BSS-associated, network-using stations. Time-successive beacons define successive time intervals during each of which the various stations are permitted to transmit communications (typically in packets). In these intervals, the AP (in the BSS group), which functions as a controller that has direct access to the particular network with respect to which all stations in the group operate, and which thus is effectively a port to the network for all stations in the BSS group, announces, as being accessible, a certain amount of available unused bandwidth (the "transmission budget"), which amount is intentionally "stated" (in the announcements) to be less than the true, full amount of available bandwidth. The undisclosed difference acts as a reserve of available bandwidth capacity.

In a regular periodic manner (beacon intervals), the AP station broadcasts to all stations in the associated BSS the above-referred-to beacons. Each beacon advises all such stations in the BBS about the then-available, so-called transmission budget which reflects, but doesn't totally state, the amount of then-available, unused bandwidth. From beacon-to-beacon, and over time, the maximum available unused bandwidth (the transmission budget) changes in accordance immediate-prior network communication activity, and so, the amount of bandwidth which is announced to be available in each such beacon transmission will change from time-to-time, depending upon such activity. All stations within the BSS may compete, during the next-following beacon interval, for such available, announced, unused bandwidth. The reserved bandwidth is made available only to "currently transmitting" stations. As will become apparent, the present invention, in this setting, plays an important enhancement role regarding the manners in which BSS stations which are not the currently transmitting stations can most effectively and efficiently gain shared access to this announced bandwidth.

In the particular representative network now being described, this role of the present invention cooperates very effectively, in relation to maximizing the overall quality of communication service in the network, with the beacon practice just outlined, whereby existing, "currently transmitting" stations are allowed a certain deferential treatment with regard to access to available bandwidth (the unannounced bandwidth), so that the network does not compromise communication quality by failing either to recognize the fact that a currently communicating station may (a) need some additional bandwidth to complete transmission activity in which it is already engaged, or (b) need such additional bandwidth to deal with the possibility that a currently transmitting station has had certain recently attempted communications fail by virtue of some kind of a communication error.

This access-differentiating behavior is actually implemented by the participating BSS stations themselves which act in a kind of self-governing manner relating to how they seek access to available bandwidth. Those stations which are not "currently" in the immediate above-mentioned (a) and (b) situations, and which wish to obtain transmission bandwidth access during a current, new beacon interval, establish for themselves, and in a manner determined by practice of the present invention, an appropriate, requestable transmission bandwidth, referred to herein as a transmission "limit". Those "currently transmitting" stations, however, are allowed to establish appropriately larger transmission "limits", thus to be self-enabled to request more of the actual additional available bandwidth including the unannounced, reserved bandwidth. The amount of such reserved bandwidth is based, in part, upon prior system-activity history, from which history the AP station performs a calculation (set forth below) relating to how much of the total available, unused bandwidth to "announce" for the transmission budget.

As will be seen, and according to the invention, when a currently non-transmitting station seeks bandwidth access, and under circumstances where, after it first attempts to gain such access, it is determined to be the sole such station seeking this access, that station is permitted to progress its access with a specially elevated transmission limit—a situation which then allows that newly entering station to build up rapidly to its full, allowable transmission-limit. Rapid build-up greatly increases the operating efficiency of that station. In situations where more than one non-currently-transmitting station have tried simultaneously to gain access, none of these is permitted to use the invention's rapid build-up approach. Instead, these plural, newly "competing" stations are constrained to build-up their respective transmission limits in the conventional, "slow" build-up manner. In the conventional, slow build-up mode of operation, a newly entering station begins with a transmission limit of 0.

DESCRIPTIONS OF THE DRAWINGS

Figure 3:
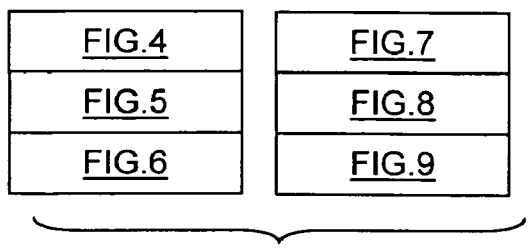

FIG. 3 provides a guide diagram illustrating how FIGS. 4, 5, and 6, and FIGS. 7, 8, and 9 may be assembled relative to on another, respectively, for reading and study.

Figure 1:
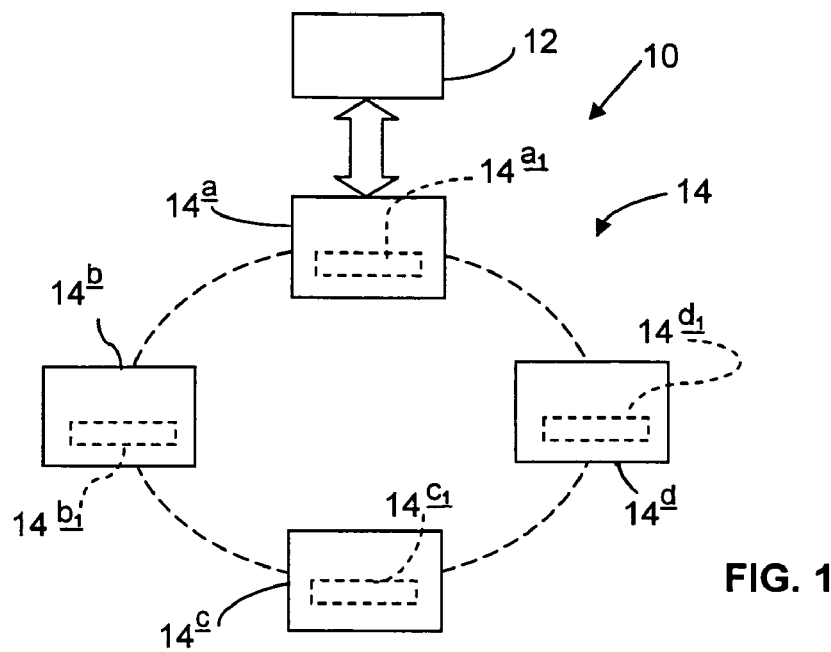
FIG. 1 is a simplified, block/schematic diagram illustrating a wireless, packet-based communication system constructed, and operating, in accordance with the present invention, and which includes a basic service set (BBS) of transmitting and receiving stations, one of which is the above-mentioned AP station.

FIGS. 4, 5 and 6 (presented on three separate plates of drawings) collectively illustrate, in tabular form, the simulated prior-art, slow build-up performances of three BSS stations somewhat like those pictured in FIG. 1, with respect to how each station's transmission-limit build-up occurs.

Figure 8:
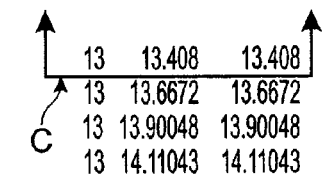

FIGS. 7, 8 and 9 collectively present a very similar "picture", illustrating how a speedier transmission-limit build-up occurs for the same three stations that are represented in FIGS. 4-6, with speedier build-up occurring in accordance with implementation and practice of the present invention.

Certain areas in FIGS. 4-9, inclusive, (discussed more fully below) are surrounded by solid-line boxes, to highlight a comparison which can be made between similar boxes similarly positioned in the two sets of three related drawing figures (FIGS. 4, 5, and 6 and FIGS. 7, 8 and 9, respectively).

DETAILED DESCRIPTION OF THE INVENTION

Along with the description which now directly follows of the method and structure of this invention, which description is made with reference to the several drawing figures, there are three text sections below (one containing a table) appearing under the headings "QoS Parameter Set Element", "Procedure at the AP", and "Procedure at the Station", where the internal behaviors of the AP and of each other station are fully expressed in detail. These three sections describe with particularity, and mathematically, how the AP station ("Procedure at the AP") calculates a reportable transmission budget, and in text, a table and mathematics, how the individual stations (all stations) ("Procedure at the Station") behave to self-govern their respective accesses to available transmission budget through the self-settings of respective transmission limits in accordance with the present invention.

In this three-section part of the text hereinbelow, and to some extent in other locations herein, certain acronyms are employed, and the following is a substantially full list of those acronyms, and of their respective meanings:

| | |
|---|---|
| AP | Access Point |
| SIF | Short Interframe Space |
| ACK | Acknowledgement |
| AC | Access Category |
| RA | Receiver |
| AP MAC | Access Point Media Access Control |
| Tx Time | Transmit Time |
| PHY | Physical (Layer) |
| QoS | Quality of Service |
| MIB | Management Information Base |
| STA | Station |

QoS Parameter Set Element

| QoS Parameter Set Element 2 *3 |
|---|
| Surplus Factor [AC] Surplus Factor[1] . . . Surplus Factor[3] |

The SurplusFactor[AC] field specifies 3 SurplusFactor values, for traffic categories 1 through 3, respectively. Each SurplusFactor is a 2 octet field, which is represented as an unsigned binary number with an implicit binary point after the leftmost 3 bits. It represents the ratio of over-the-air bandwidth reserved for that AC to bandwidth of the transported MSDUs required for successful transmission. As such, it must be greater than unity.

Procedure at the AP

The AP shall measure the amount of time occupied by transmissions for each AC during the beacon period, including associated SIFS and ACK times if applicable. The AP shall maintain a set of counters TxTime[AC], which shall be set to zero immediately following transmission of a beacon. For each Data frame received by the AP with the RA equal to the AP MAC address, or transmitted by the AP, and which has a nonzero AC, the AP shall add to the TxTime counter corresponding to the AC of that frame, a time equal to:

a) The time on-air of the frame, including the preamble and PHY header, if the acknowledgement policy is set to "no acknowledgement";

b) The time on-air of the frame, including the preamble and PHY header, plus the duration of the acknowledgement frame and aSIFSTime if the acknowledgement policy is set to "acknowledge".

The AP shall transmit in each beacon the TxBudget for each AC, contained in the QoS Parameter Set element, along with SurplusFactor. The TxBudget is the additional amount of time available for an AC during the next beacon period. The AP shall set the TxBudget to be:

TxBudget[AC]=MAX{(aACTransmitLimit[AC]Tx-Time[AC]*SurplusFactor[AC]),0}

The variable aACTransmitLimit[AC] is a MIB variable at the AP for the maximum amount time that may be spent on transmissions of a specific AC, per beacon interval. This value should be scaled to aDot11BeaconPeriod. If no admission control is applied (for a specific AC), the TxBudget shall be set to 32767, which is deemed to be infinity. If TxBudget[AC] becomes negative, it will be set to zero.

Procedure at the Station

Stations, including the AP, shall maintain four variables for each of AC, as shown:

TABLE

Admission Control variables at the station

| State Variable | Description |
| --- | --- |
| TxCounter | Counts the transmission time during this beacon interval, not including unsuccessful transmission if the transmission status is available; |
| TxUsed | All transmission time used. |
| TxLimit | Limits the counter |
| TxRemainder | Stores a possibly capped limit remainder |
| TxMemory | Memorizes the limit |

The variable TxCounter counts the amount of time occupied on-air by transmissions from this station for each specific AC, including associated SIFS and ACK times if applicable. For each data frame transmitted by the station which has a non-zero AC, no matter whether this frame successfully transmitted or not, the station shall add to the TxUsed[AC] corresponding to the AC of the frame, a time equal to:

a) The time on-air of the frame, including the preamble and PHY header, if the acknowledgement policy is set to "no acknowledgement"

b) The time on-air of the frame, including the preamble and PHY header, plus the duration of the acknowledgement frame and aSIFSTime if the acknowledgement policy is set to "acknowledge"

At the same time, the station maintains another counter, TxCounter[AC], which counts only the successful transmission if the status is know by the station. The station shall not transmit a data frame if doing so would result in the value in TxUsed[AC] exceeding the value in TxLimit[AC]. If the station is prevented from sending a frame for this reason, it may carry over the partial frame time remainder to the next beacon period, by storing the remainder in TxRemainder[AC]:

TxRemainder[AC]=TxLimit[AC]—TxUsed[AC]

Otherwise, TxRemainder[AC] shall be zero.

At each target beacon transmission time, irrespective of whether a beacon was actually received, the TxMemory, TxLimit and TxCounter state variables are updated according to the following procedure:

If TxBudget[AC]=0, TxMemory[AC] shall be set to zero for new STAs which starts transmission with this AC in the last Beacon interval, other STAs remain TxMemory[AC] unchange;

If the TxBudget[AC]>0,

TxMemory[AC]=f×TxMemory[AC]+(1−f)(TxCounter[AC]*SurplusFactor[AC]+TxBudget[AC])

TxCounter[AC]=0

TxLimit[AC]=TxMemory[AC]+TxRemainder[AC]

Where the damping factor f is the MIB parameter dotl1TXLimit DampingFactor[AC], which has a default value of 0.9. Damping does not affect the entrance of a new flow into the system when enough budget is available, because the decreased TxBudget is offset by an increased TxCounter instantaneously, so TxMemory does not change. The damping does affect TxMemory when a new flow starts up in another node. In that case, the decreased TxBudget is not offset by an increased TxCounter and the TxMemory will converge to the lower target value consequently.

The TxBudget that is used in this calculation shall be the budget that was most recently obtained from the AP. The TxCounter value shall be the value of the beacon period before the period that just ended (i.e. if the beacon period that just ended has index k, then TxCounter(k−1) shall be used in the calculation, instead of TxCounter(k)). Taking the earlier value accounts for the delay that occurs between the moment at which the AP determined the TxBudget and the point at which this budget will be used in the above calculations.

The value TxCounter+TxBudget is the target to which TxMemory converges. The TxLimit is equal to TxMemory plus a possible capped remainder.

TxMemory 'memorizes' the amount of resource the node has been able to spend in a specific AC. Once the budget is depleted (i.e. TxBudget hovers around 0), TxMemory converges to TxCounter, which is the lower limit. This ensures that the node will be able to continue consuming the same amount of resource in following beacon periods. The damping allows for some amount of fluctuation to occur. But TxMemory will not be able to grow any further in the saturated state. This prevents new flows from entering the specific AC when it is saturated. The Initial value of this variable may be set to a value between [0, TxBudget/SurplusFactor[AC]), for example, a value of 80 percent of the announced TxBudget when SurplusFactor[AC] equals 1.1.

STAs shall not increase their TxLimit[AC] if they did not transmit traffic with the AC in the last beacon.

Distributed Admission Control should be used for ACs with traffic that is rate capped, like video or voice.

Turning now to the drawings, FIG. 1 therein generally illustrates at 10 a packet-based wireless communication network environment, or system, which is constructed, and which operates, in accordance with the present invention. For illustration purposes only herein, network 10 takes the form of a Local Area Network (LAN), but it should be understood that the invention may be employed in a wide variety of error-prone communication networks. System 10 is also one wherein transmission budget announcements are based upon the "announced" and "unannounced" (reserve) practice mentioned above.

Included in environment 10 is the LAN network portion per se 12 which substantially interconnects all interconnected and involved users, including a single illustrated BSS group 14 of plural stations, such as stations 14a, 14b, 14c, 14d. Station 14a acts as the access point (AP) controller computer, and the other three stations are simply communicating transmitter/receiver computers which form part of this basic service set. AP 14a, in addition to being the controller computer in set 14, is also one of the several individual transmitter/receiver computer communicating stations in the set. All of the station-specific rules of operation which apply to the other stations in set 14 also apply to station 14a. All stations build transmission limits in accordance with the present invention. It is station 14a alone, however, which is responsible for transmitting the beacons mentioned earlier, wherein transmission budget announcements are prepared and communicated to all of the communicating stations in the set.

Figure 2:
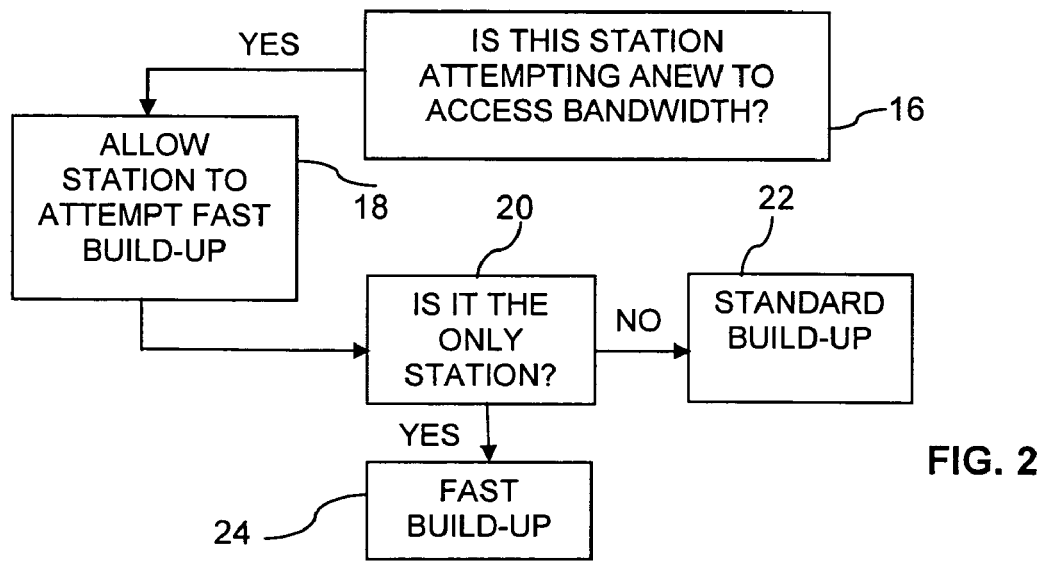
FIG. 2 illustrates, inter alia, control componentry which is present in each of the computer stations shown in FIG. 1, and which performs certain ones of the methodologic steps of the invention. This figure can be viewed as illustrating both structural and methodologic features of the invention.

One should envision the several blocks that represent communication stations in BSS 14 in FIG. 1 to have appropriately contained within them, via hardware, firmware and software, the appropriate structures that will be, and are, employed in accordance with practice of the present invention to control network bandwidth access. Dashed lines within these blocks symbolize these structures. Very specifically, pictured in dashed block form within computers, or stations, 14a, 14b, 14c, 14d, are structures 14a1, 14b1, 14c1, and 14d1, respectively. These structures perform within these respective stations the task of self-establishing respective transmission limits per the practice of the invention, which limits are, and will be, self-calculated and self-imposed limits. Dashed block 14a1 in station 14a further represents structure, and methodology performed, within this AP station that controls the special announced and unannounced bandwidth beacon broadcasts that take place in system 10 to all stations 14a, 14b, 14c, 14d. FIG. 2 in the drawings illustrates more fully the structure within, and the methodology performed by, all of stations 14a, 14b, 14c, 14d regarding the practice of transmission-limit build-up in accordance with the invention Directing attention now specifically to FIG. 2, each of previously mentioned blocks 14a1, 14b1, 14c1, 14d1, includes blocks, 16, 18, 20, 22, and 24 which are functionally and physically operatively interconnected as shown. From a structural point of view, these blocks collectively constitute what is referred to herein as bandwidth-sharing control substructure. These blocks specifically picture schematically the structure, and certain methodology performed thereby, which is generally referred to at least in part, in the "Characterization of the Invention" section of the above-referenced, priority U.S. Provisional Patent Application. The structure within, and the methodology implemented by, AP station 14a in relation to broadcasting transmission budget are not specifically illustrated herein, inasmuch as they do not form part of the present invention.

Within each station, block 16 (also referred to herein as first componentry) determines, for each one of successive, time-spaced intervals between beacon transmissions, whether the associated station is attempting to gain access to network bandwidth under circumstances where it is not currently transmitting.

If the answer is Yes, control flows to block 18 (also referred to herein as second componentry) which allows that station to attempt to perform fast build-up of its transmission limit. In this attempt, the station calculates a fast build-up initial transmission limit which, in the particular system now being described, is 80-persent of the available bandwidth budget which was announced by the AP in the last previous beacon interval. Control then flows from block 18 to block 20 (also referred to herein as third componentry) which effectively determines whether the subject station is then the only station in BSS 14 which has attempted to gain bandwidth access. This determination actually takes place during the beacon interval which immediately follows the specific beacon interval during which the station was allowed, by block 18, to "attempt" fast build-up. Where the station turns out to be the only station which has attempted to gain access at one particular moment in time, the AP will be announcing a non-zero transmission budget amount that will allow the single subject station to acquire, as a real value, the stated 80-percent portion of the announced budget. If however, two or more stations have acted simultaneously, then they will collectively have asked (in their allowed "attempted" uses of fast build-up by blocks 18) for more than 100-percent of the announced available budget, and since this creates an impossible situation, the AP will, according to this invention, announce a 0-available budget, which announcement will force the plural, simultaneously competing, newly entering stations to begin (slow build-up) each with an initial transmission limit of 0.

Thus, and effectively, a No answer from block 20 will pass control to block 22 (also referred to herein as fourth componentry) which dictates the use of slow transmission-limit build-up. A Yes answer passes control to block 24 (also referred to herein as fifth componentry) which implements rapid-transmission-limit build-up as proposed by the present invention. The algorithm which enables this rapid build-up is described in detail collectively in the text passages set forth above under the headings of "QoS Parameter Set Element", "Procedure at the AP", and "Procedure at the Station".

Turning attention now to FIGS. 3-6, inclusive, FIG. 3 describes on its left side how FIGS. 4-6, inclusive, should be "assembled" for co-viewing.

FIGS. 4-6, inclusive, illustrate, numerically, and in tabular form, a simulated, prior art operation of a system somewhat like system 10 as illustrated in FIG. 1, but wherein transmission-limit build-ups always take place conventionally (slow build-up) over a relatively large number of successive inter-beacons intervals. Such conventional buildups are illustrated in FIGS. 4-6, inclusive, for three different network BSS stations, labeled "Station 1", "Station 2" and "Station 3". These three stations could sit in a system in the places, for example, shown for stations 14a, 14b, 14c, respectively, in FIG. 1. Referring expressly to what is pictured in FIGS. 4-6, inclusive, the transmission limit for Station 1 takes place effectively over about four inter-beacons transmission intervals. This build-up is contained within the block which is labeled A. Similarly, the transmission limit build-up for Station 2, as pictured in FIGS. 4-6, inclusive, takes place over a span of time occupied by about seven or eight inter-beacon transmission intervals. This build-up is surrounded by a block labeled B. Finally, and with reference to Station 3, transmission limit build-up is seen to take place over an even longer interval which encompasses about sixteen inter-beacon transmission intervals. This transmission limit build-up is pictured in a block which is labeled C.

In the build-up illustrations provided in FIGS. 4-6, inclusive, Stations 1, 2, and 3 are seen to be attempting to gain bandwidth access during different beacon intervals. Not expressly pictured for each of these three stations is that, in the particular beacon intervals which immediately precede the intervals in which these stations show a positive (non-0) transmission limit, each of these stations has begun its network bandwidth access with a 0 transmission limit. This is conventional practice.

Turning comparative attention now to FIGS. 7-9, inclusive, these figures illustrate generally the same kind of transmission-limit build-up operation just described, but here with respect exactly to system 10 as so far described, wherein the present invention is at work.

In FIGS. 7-9, inclusive, Stations 1-3 now can be viewed as relating, for example, exactly and respectively to stations 14a, 14b, 14c as described above. Surrounded by blocks labeled A, B, C in this set of drawing figures are several transmission limit buildups which occur for Stations 1, 2, and 3 very rapidly in accordance with the invention. Blocks A, B and C in these three drawing figures (7, 8, 9) should be compared directly and respectively with blocks A, B, and C in the first discussed set of three figures (4, 5, 6) drawings. One can see here that each of Stations 1, 2, and 3 has been allowed (because it has begun to acquire network bandwidth access singularly in different beacon intervals i.e., not simultaneously with another station or stations) to initiate, and continue or progress, the fast build-up mode of behavior provided by the invention.

The algorithm which is implemented according to the present invention to perform a rapid build-up of transmission limit is fully set forth in the contents of the text material above under the three topic headings which have been specifically mentioned earlier herein.

Thus, by the quite simple technique of starting off an entering station with a special initial transmission memory, and thus a transmission limit, which is a percentage value of the most recently announced transmission budget that is greater than zero, significant speed-up can be furnished for the build-up of transmission limits in participating stations in a BSS.

As was mentioned earlier, while a preferred value of 80-percent of announced transmission budget is employed in the algorithm that operates to produce rapid transmission-limit build up, other values, within a defined range of percentages may be employed. According to the invention, the percentage range just referred to lies between just above 0-percent, to an upper limit of about 1/Surplus Factor [AC]-percent. See particularly the discussions presented in the three heading-labeled text sections earlier referred to herein. Significantly, where more than one currently non-transmitting station is attempting, during the same beacon interval, to gain available network bandwidth anew, noner is permitted to do so, and this prohibition operates to minimize the likelihood of a network-communication traffic jam occurring.

Thus the novel structure and method of this invention offer a significant and unique way of improving quality of service in a network communication system, or environment, of the type which has been generally described herein. They do so by (a) preparing network BSS stations to establish respective transmission limits more rapidly than normal (fast transmission-limit build-up) under circumstances where just one currently non-transmitting station is attempting to gain available network bandwidth, and (b) otherwise to perform such build-up in a conventional (slow build-up) manner. This behavior takes place in a priority-category-specific manner. Thus, a station already transmitting in one particular priority category, may treat itself simultaneously as a "newly entering" station in another priority category, wherein the transmission-limit build-up practice of the present invention also takes place.

Variations and modifications certainly can be made to implement this unique transmission-limit build-up approach in many different kinds of settings, and these variations and modifications will be appreciated by those generally skilled in the art.

I claim:

1. Apparatus for invoking rapid build-up of a transmission limit in a currently non-transmitting basic service set (BSS) station of a selected priority category in a wireless, prioritized, network communication system, which station is seeking access to available network bandwidth, where the network is one wherein periodic announcements regarding available, unused transmission bandwidth budget are announced to all BSS stations of the mentioned, selected priority category in the network, said apparatus comprising, computer structure provided for and in each BSS station in a selected priority category in the network, and provided within that said computer structure, (1) first componentry structured to determine when a currently non-transmitting station of the selected priority category mentioned above is attempting to seek network bandwidth access and for generating a Yes output signal when such attempting occurs, (2) second componentry operatively connected to said first componentry, structured, in response to such a Yes output signal, to allow the mentioned, currently non-transmitting station to attempt rapid build-up and to produce a control output signal, (3) third componentry operatively connected to said second componentry for receiving a control output signal generated by said second componentry, and structured (a) make an assessment whether or not the mentioned, currently non-transmitting station then seeking bandwidth access is, at the moment in time of the mentioned bandwidth access seeking, the only station seeking such access, and (b) to generate a third-componentry Yes/No output signal regarding the mentioned assessment, (4) fourth componentry operatively connected to said third componentry and structured for receiving a No output signal from said third componentry, operable, in response to receiving such a No output signal, to implement conventional transmission-limit build-up in the mentioned, currently non-transmitting station, and (5) fifth componentry operatively connected to said third componentry, structured to receive any Yes output signal generated by said third componentry, and operable, in response to receiving such a third-componentry Yes signal, to allow a continued, accelerated transmission-limit build-up in the subject station via ensuring for that subject station a transmission limit which is calculated as a defined percentage of a last-announced transmission-bandwidth budget.

* * * * *